(12) United States Patent
Gingras et al.

(10) Patent No.: US 11,155,047 B2
(45) Date of Patent: Oct. 26, 2021

(54) CAUL BODY AND A METHOD FOR FORMING A COMPOSITE STRUCTURE

(71) Applicant: Bell Helicopter Textron Inc., Fort Worth, TX (US)

(72) Inventors: Richard Gingras, Montreal (CA); Stephane Laurin, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 234 days.

(21) Appl. No.: 16/154,666

(22) Filed: Oct. 8, 2018

(65) Prior Publication Data
US 2020/0108567 A1 Apr. 9, 2020

(51) Int. Cl.
| B29C 70/34 | (2006.01) |
| B29C 70/46 | (2006.01) |
| B29C 33/38 | (2006.01) |
| B29L 31/00 | (2006.01) |
| B29L 31/30 | (2006.01) |

(52) U.S. Cl.
CPC ........ B29C 70/345 (2013.01); B29C 33/3828 (2013.01); B29C 33/3842 (2013.01); B29C 70/46 (2013.01); B29C 2033/385 (2013.01); B29L 2031/3082 (2013.01); B29L 2031/757 (2013.01)

(58) Field of Classification Search
None
See application file for complete search history.

(56) References Cited

U.S. PATENT DOCUMENTS

| 5,071,338 | A | * | 12/1991 | Dublinski | B29C 33/307 156/382 |
| 5,217,669 | A | * | 6/1993 | Dublinski | B29C 33/307 264/258 |
| 5,433,418 | A | | 7/1995 | Nowak et al. | |
| 5,645,670 | A | | 7/1997 | Reinfelder et al. | |
| 5,876,546 | A | * | 3/1999 | Cloud | B29C 70/086 156/212 |
| 6,290,895 | B1 | | 9/2001 | Wang et al. | |
| 7,534,387 | B2 | * | 5/2009 | Zenkner | B29C 70/342 264/313 |
| 8,353,696 | B2 | | 1/2013 | Barber et al. | |
| 8,763,753 | B2 | * | 7/2014 | Kray | F02C 7/24 181/292 |
| 2008/0116618 | A1 | * | 5/2008 | Martin | B29C 70/44 264/480 |
| 2011/0259508 | A1 | * | 10/2011 | Inserra Imparato | B29C 70/44 156/182 |

(Continued)

OTHER PUBLICATIONS

Canadian Exam Report in related Canadian Patent Application No. 3,020,603 dated Sep. 27, 2019, 4 pages.

*Primary Examiner* — Jacob T Minskey
*Assistant Examiner* — Baileigh Kate Darnell
(74) *Attorney, Agent, or Firm* — Lightfoot & Alford PLLC

(57) ABSTRACT

A caul body for forming a composite structure comprises a laminate having at least one carbon layer and at least one silicone layer. The at least one silicone layer defines an outer surface of the laminate. The laminate has a first region and a second region. A thickness of the at least one carbon layer in the first region is greater than a thickness of the at least one carbon layer in the second region. The first region has a hardness value greater than a hardness value of the second region.

20 Claims, 3 Drawing Sheets

(56) References Cited

U.S. PATENT DOCUMENTS

2012/0204741 A1     8/2012   Bremmer et al.
2013/0206503 A1*   8/2013   Kray ........................ F02C 7/24
                                                                                       181/292

* cited by examiner

US 11,155,047 B2

CAUL BODY AND A METHOD FOR FORMING A COMPOSITE STRUCTURE

TECHNICAL FIELD

The application relates generally to manufacturing of composite structures and, more particularly, to a caul body for forming a composite structure.

BACKGROUND

Caul plates may be used during a curing process of a composite structure to improve and equalize pressure distribution over the composite structure. The caul plate contacts the composite structure during the curing process. Generally, an inner molding line of the caul plate has the same size and shape as an outer molding line of the composite structure. However, the caul plate may not adequately conform to composite structures that have complex geometries. As such, it may be difficult to distribute adequate pressure to the complex geometries of the composite structure.

SUMMARY

In one aspect, there is provided a caul body for forming a composite structure, the caul body comprising: a laminate having at least one carbon layer and at least one silicone layer, the at least one silicone layer defining an outer surface of the laminate, the laminate having a first region and a second region, a thickness of the at least one carbon layer in the first region being greater than a thickness of the at least one carbon layer in the second region, the first region having a hardness value greater than a hardness value of the second region.

In another aspect, there is provided a method of forming a composite structure, the method comprising: laying-up a first surface of an uncured composite structure against a first mold region and a second mold region of a mold, the first mold region having a curvature value less than a curvature value of the second mold region; placing an outer silicone layer of a caul body to cover the uncured composite structure laid-up against the mold and to overlap the first mold region with a first caul region of the caul body, and to overlap the second mold region with a second caul region of the caul body, the first caul region having a hardness value greater than a hardness value of the second caul region; and curing the uncured composite structure covered by the caul body with pressure and heat to form a first composite region and a second composite region of the composite structure.

In a further aspect, there is provided a caul body for forming a composite structure, the caul body comprising: a laminate including at least one carbon layer sandwiched between silicone layers, the silicone layers defining at least one outer surface of the laminate to abut against the composite structure, the laminate having a first region having a first hardness value and at least a second region having a second hardness value less than the first hardness value, a thickness of the at least one carbon layer in the first region being greater than a thickness of the at least one carbon layer in the second region.

In a further aspect, there is provided a method of forming a caul body, the method comprising: laying-up at least one uncured carbon layer; varying a thickness of the at least one uncured carbon layer to form a first region of the caul body having a first hardness value and at least a second region of the caul body having a second hardness value less than the first hardness value; laying-up at least one uncured silicone layer to cover the at least one uncured carbon layer; and curing the at least one uncured carbon layer and the at least one uncured silicone layer into a laminate, the cured at least one silicone layer forming an outer surface of the caul body.

DESCRIPTION OF THE DRAWINGS

Reference is now made to the accompanying figures in which.

DETAILED DESCRIPTION

Figure 1:
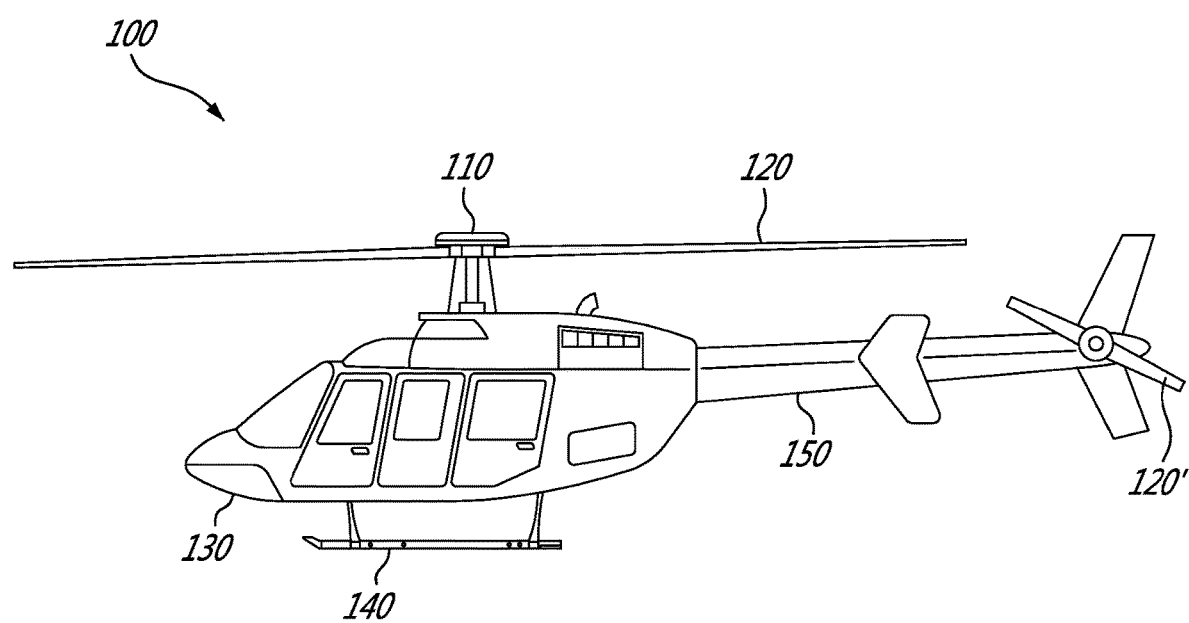
FIG. 1 is a schematic side view of a rotorcraft in accordance with a particular embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. It should also be appreciated that the description herein regarding rotorcraft 100 may apply to aircraft and vehicles other than rotorcraft, such as airplanes and unmanned aircraft, to name only a few examples.

The fuselage 130 may be made from composite materials or may include sections made from the composite materials. The present disclosure relates to a caul body that may be used in curing composite materials to form the fuselage 130.

Figure 2:
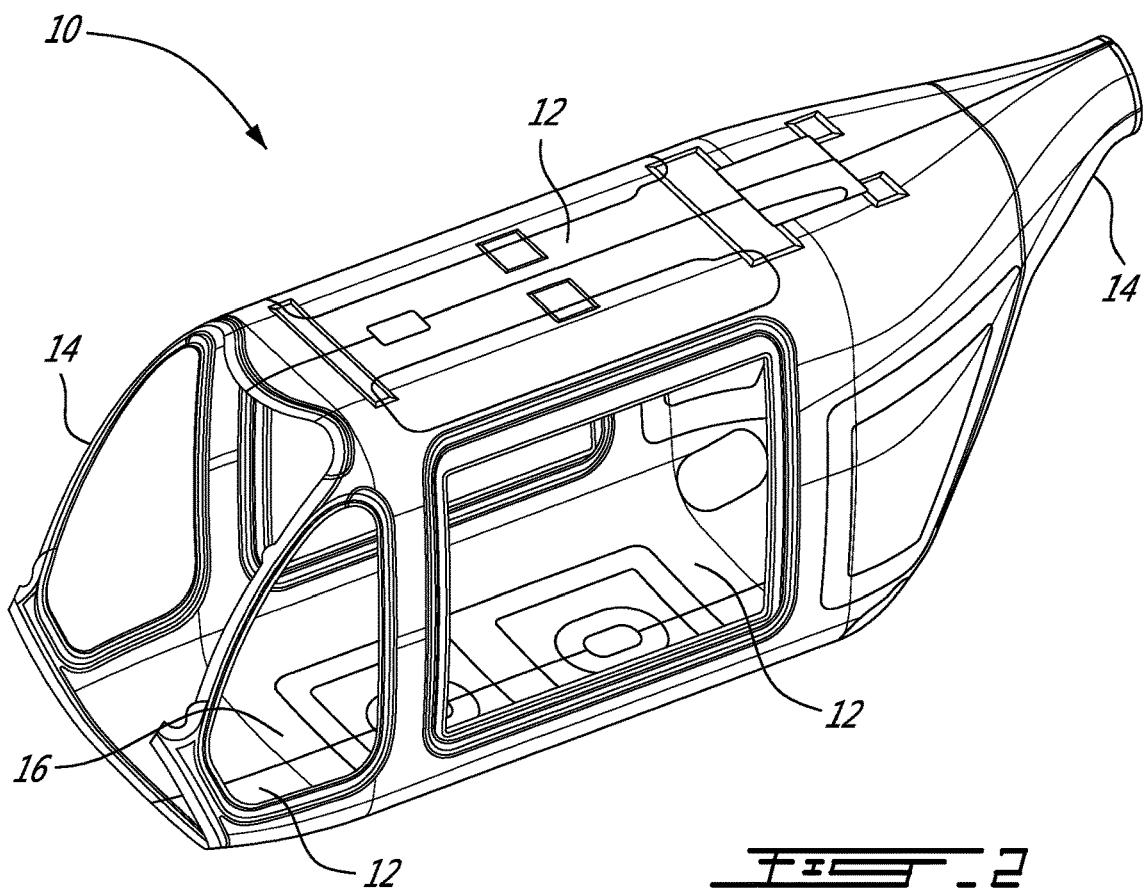
FIG. 2 is a perspective view of a caul body, according to an embodiment of the present disclosure.

FIG. 2 illustrates the caul body 10 in accordance with an embodiment. The caul body 10 may be used in the curing process of an uncured composite structure in order to form a cured composite structure or part, such as for example the fuselage 130. For example, the caul body 10 may be used for forming the composite structure in an autoclave. The caul body 10 may be referred to as a "caul plate" or simply as a "caul". The caul body 10 is a structure that abuts the uncured composite structure during the curing process. For example, the caul body 10 may surround the composite structure in the autoclave to cure the composite structure from an uncured state to a cured state. The caul body 10 helps to distribute pressure over the uncured composite structure during the curing process. The term "uncured" refers to composite material that includes a fabric material (woven or not) impregnated with an uncrystallised resin to facilitate handling, but flexible enough so as to allow forming to a desired shape, including, but not limited to, prepreg material including B-Stage resin. The term "B-Stage" may be used to refer to an uncured stage. In some instances, the term "uncured"

may refer to a partially cured composite material. The material composition of the uncured composite structure may be a fiber, such as carbon or glass, in a matrix of epoxy resin. The caul body 10 is removed from the cured composite part, and may be reused multiple times during the curing of other composite structures having the same shape.

The caul body 10 may have different shapes depending on the shape of the composite structure to be formed. For example, in the embodiment shown in FIG. 1, the caul body 10 has a shape of the fuselage 130 of the rotorcraft 100. The caul body 10 may have any suitable airframe shape or may have a shape of a section of the fuselage 130. The fuselage 130 in the depicted embodiment is the composite structure whose curing is facilitated by the caul body 10.

The composite structure has a complex geometry. That is, the shape of the composite structure is curved in certain portions. The composite structure has portions or regions with sharp bends or curves, and which are more curved than other portions or regions of the composite structure which are flat or substantially flat. In this disclosure, a region with the flat, or substantially flat, shape may be referred to as a "first" region and a region with a complex geometry may be referred to as a "second" region. The term "substantially flat" is intended to refer to a surface that may be flat or gently curved. The first region is less curved than the second region. It will be appreciated that the designators "first" and "second" are chosen only to facilitate description of the features herein, and do not limit the composite structure or the caul body 10 to having only two regions.

Still referring to FIG. 2, the caul body 10 includes one or more first regions 12 and one or more second regions 14. Similarly to the composite structure, the first region 12 of the caul body 10 is less curved than the second region 14 of the caul body 10. The caul body 10 has a shape complementary to the shape of the composite structure. As such, the shape of the first regions 12 of the caul body 10 is complementary to the shape of the first regions of the composite structure to be formed, and the shape of the second regions 14 is complementary to the shape of the second regions of the composite structure. For example, an outer surface 16 of the caul body 10 has the same shape as the outer surface of the composite structure. In other words, the outer surface 16 of the caul body 10 defines an outer mold line (OML) of the composite structure to be formed.

Figure 3:
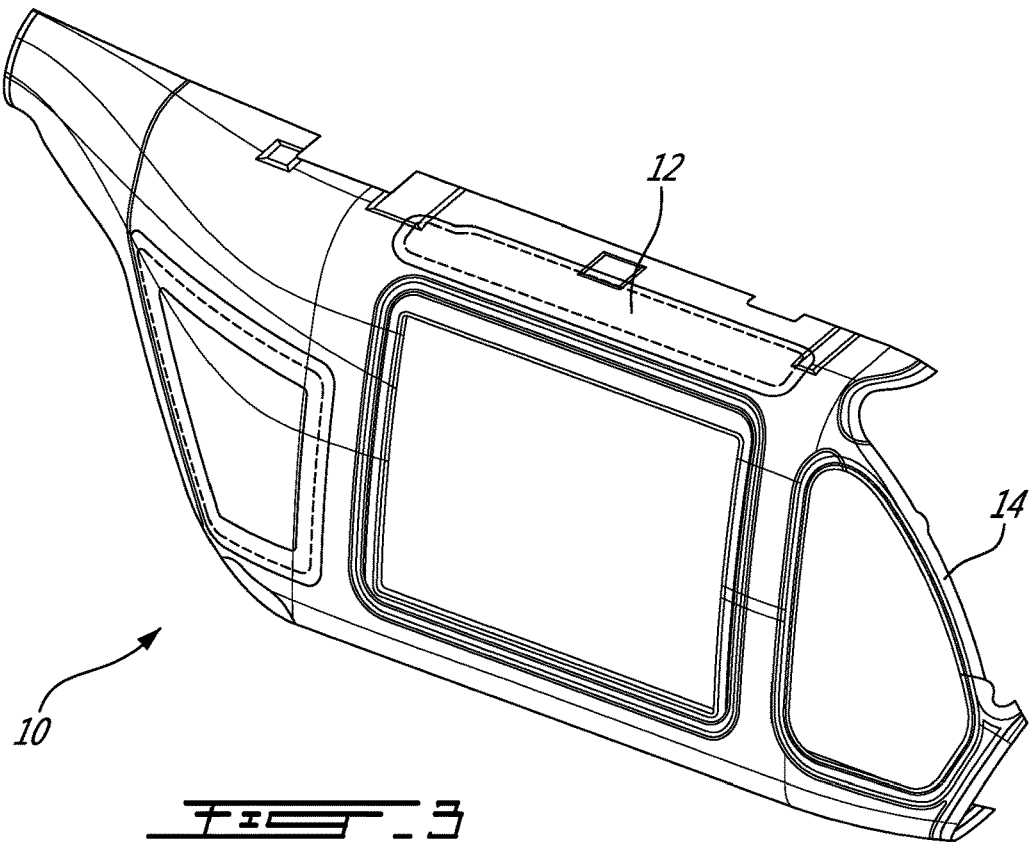
FIG. 3 is a view of a lateral section of the caul body.

FIG. 3 shows part of the caul body 10. The first and second regions 12, 14 of the caul body 10 have different hardness values. In other words, the hardness of the caul body 10 varies from one region 12, 14 to another. The hardness value may be defined as a measure of the resistance to localized elastic and/or plastic deformation that may be induced by mechanical indentation or abrasion. The hardness values described herein may be provided in any suitable units including, but not limited to, kgf/mm², HB and Shore durometer. The hardness values may be determined using any suitable technique including, but not limited to, the Vickers hardness test, the Brinell scale and a durometer.

In the depicted embodiment, the second region 14 has a lower hardness value, and is thus softer, than the first region 12. The softer second region 14 is more pliable than the harder first region 12. The second region 14 is thus better adapted to be applied to the curved geometry of a correspondingly-shaped curved second region of the uncured composite structure. The surface finish of the composite structure after curing may have better quality when the caul body 10 better conforms to the outer surface of the uncured composite structure.

The harder first regions 12 of the caul body 10 are applied to correspondingly-shaped first regions of the uncured composite structure, and help to provide a better surface finish of these regions of the composite structure when the caul body 10 is placed to cover the uncured composite structure. As such, in some embodiments, these first regions of the composite structure, once cured, may require less surface finishing after the curing process. The finishing of the cured composite structure that follows the curing process may include priming and painting. The better surface finish of these regions of the cured composite structure may result in less work or less time being needed to bring these regions of the cured composite structure to an acceptable state of final painted product, when compared to regions of the cured composite structure cured under other, softer regions of the caul body 10.

Figure 4:
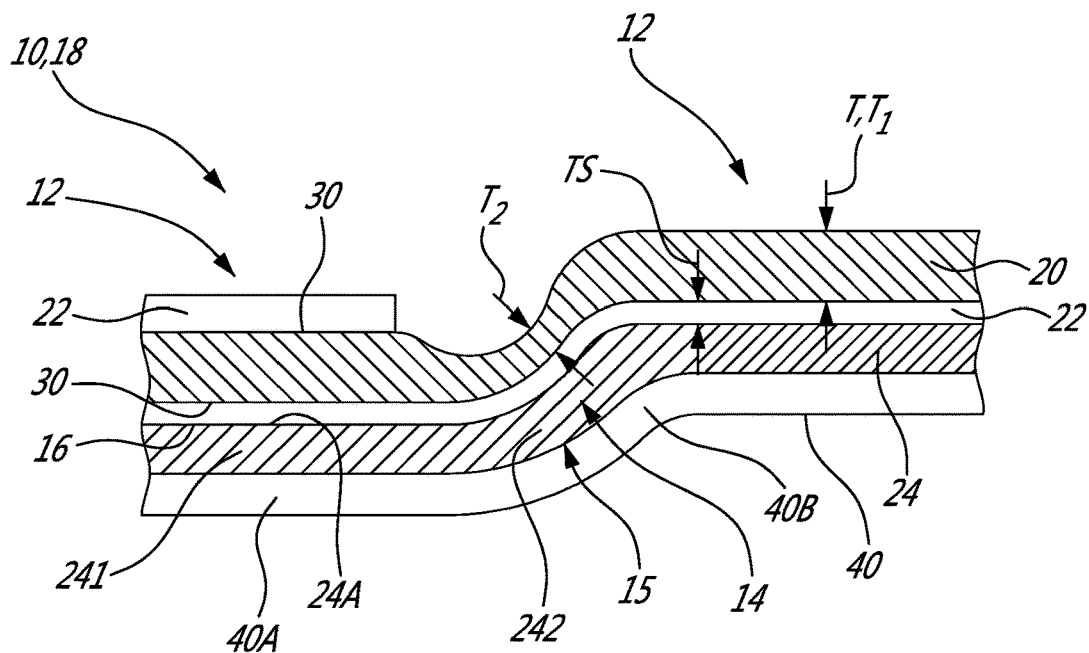
FIG. 4 is a schematic cross-sectional view, fragmented, of a laminate of the caul body.

Referring to FIG. 4, a cross-sectional view of the caul body 10 is shown. The caul body 10 includes a laminate 18. In other words, the caul body 10 is a lay-up of composite material layers that are cured together to form the caul body 10. The laminate 18 has a varying thickness which corresponds to a varying hardness of the caul body 10. The lay-up of material layers includes different materials. The caul body 10 in the depicted embodiment includes a carbon layer 20 (more than one carbon layer 20 is also possible), and silicone layers 22. The carbon layer 20 is shown in FIG. 4 as being sandwiched between two silicone layers 22. The caul body 10 may include additional layers of material.

The silicone layer 22 defines the outer surface 16 of the laminate 18, and thus, of the caul body 10. In use, the silicone layer 22 may help to spread the pressure adequately over the uncured composite structure 24 during curing to form the cured composite structure. For example, the silicone layer 22 may expand and conform to the outer surface 24A of the uncured composite structure 24 when the silicone layer 22 is heated during the curing process of the uncured composite structure 24. The silicone layer 22 of the caul body 10 may help the caul body 10 to conform to the complex geometries of the uncured composite structure 24, such as a curved region 15. In some embodiments, the silicone layer 22 may help to more equally distribute pressure during curing on the uncured composite structure 24.

The silicone layer 22 may prevent the caul body 10 from sticking to the uncured composite structure 24 during the curing process. The silicone layer 22 in the embodiment of FIG. 4 has a constant thickness TS, particularly prior to the caul body 10 being heated during curing of the uncured composite structure 24. The coefficient of expansion for the silicone in the silicone layer 22 may be high, and having a constant thickness TS of silicone may help stabilize the thickness expansion of the caul body 10 while it is being cured. The thickness 26 of the silicone layer may be between 50 to 100 millimetre (mm). For example, the thickness may be 60 mm.

The carbon layer 20 may include a prepreg ("pre-impregnated") carbon fabric material. The term "prepeg" may refer to a fabric of an uncured or partially cured thermoset matrix containing fibers which might be woven or unidirectional. The carbon layer 20 may include multiple plies, such as plies of the prepeg carbon fabric. A thickness T of the carbon layer 20 may be increased by providing more plies and/or thicker plies. Increasing the thickness of the carbon layer 20 increases the hardness of the carbon layer 20. The carbon layer 20 provides hardness to the caul body 10. The thickness T of the carbon layer(s) 20 is proportional to the hardness value of the caul body 10 in the different regions 12,14 of the caul body 10. In FIG. 4, a thickness T1 of the carbon layer 20 in the first region 12 of the caul body 10 is greater than the thickness T2 of the carbon layer 20 in the second region 14. The hardness value of the thicker carbon layer 20 in the more flat first region 12 of the caul body 20 is greater than the hardness value of the thinner carbon layer 20 in the curved second region 14. This variable hardness allows the caul body 10 to be more flexible and pliable in the second region 14 to better conform to the curved shape of the uncured composite structure 24, while still having harder first regions 12 to provide a better surface finish to the flatter portions of the uncured composite structure 24. It will therefore be appreciated that the caul body 10 may be made soft or softer only in the regions of the caul body 10 that correspond to the complex curved geometry of the uncured composite structure 24, while remaining hard or harder in most or a majority of the other regions of the caul body 10. Therefore, the majority of the composite structure 24 after curing will likely have a good surface finish and only a small amount of work may be required to fix the relatively poorer surface finish of the cured composite structure in areas that were covered by the softer regions of the caul body 10. In some embodiments, the silicone layer 22 does not affect the hardness value of the caul body 10.

The carbon layer 20 may be coated or enfolded with silicone material and co-cured together to form the laminate 18. The caul body 10 may have the silicone layer 22 on only one outer surface, or on both outer surfaces. That is, the outer surface 16 of the caul body 10 abutting the uncured composite structure 24 is the silicone layer 22. In the embodiment shown in FIG. 4, the carbon layer 20 is sandwiched between two silicone layers 22 along part of the caul body 10. The term "sandwiched" as used in relation to the silicone layers 22 is intended to refer to a carbon layer 20 positioned between two silicone layers 22. Along some of the caul body 10, there is only one carbon layer 20 and one silicone layer 22. Other constructions of the laminate 18 which forms the caul body 10 are possible. In an alternate embodiment, the laminate 18 includes alternating carbon and silicone layers 20,22. An adhesive 30 is positioned between the carbon layer 20 and the silicone layer 22 in the laminate 18. During curing of the laminate 18 to form the caul body 10, the adhesive 30 becomes integral with the carbon and silicone layers 20,22 and helps to adhere them together. The adhesive 30 may be configured to not interfere with the thickness or hardness value of the laminate 18 or the caul body 10. In the depicted embodiment, the adhesive 30 is a relatively thin dry glass fabric positioned between adjacent carbon and silicone layers 20,22 in the laminate 18. In an embodiment, one of the regions of the laminate 18 of the caul body 10 includes a lay-up of the silicone layer 22, covered by a ply of the dry glass fabric adhesive 30, covered by the uncured carbon layer 20 having the desired thickness, covered by another ply of the dry glass fabric adhesive 30, and covered by another silicone layer 22.

Still referring to FIG. 4, the carbon structure may be formed by laying-up a first surface of the uncured composite structure 24 against a first mold region 40A and a second mold region 40B of a mold 40. The first mold region 40A has a curvature value less than a curvature value of the second mold region 40B. The outer silicone layer 22 of the caul body 10 is placed over, or to cover, the uncured composite structure 24 laid-up against the mold 40 to overlap the first mold region 40A with the first region 12 of the caul body 10 and to overlap the second mold region 40B with the second region 14 of the caul body 10. The uncured composite structure 24 may then be cured while being covered by the caul body 10 with pressure and heat to form a first cured composite region 241 and a second cured composite region 242 of the composite structure.

The caul body 10 may be formed by laying-up one or more uncured carbon layers 20, for example in Stage B. The thickness T of the carbon layer(s) 20 may be varied. For example, the thickness T, and thus the hardness of the cured caul body 10, may be varied by varying the thickness of the plies and/or varying the number of plies of the carbon layer 20. Forming the caul body 10 may include laying-up one or more uncured silicone layers 22, for example in Stage B, adjacent the carbon layer 20 such that the silicone layer 22 forms at least one of the outer surfaces 16 of the caul body 10. The carbon and silicone layers 20,22 are then co-cured in the autoclave into the laminate 18. The caul body 10 may then be used during the curing of the uncured composite structure 24.

Figure 5:
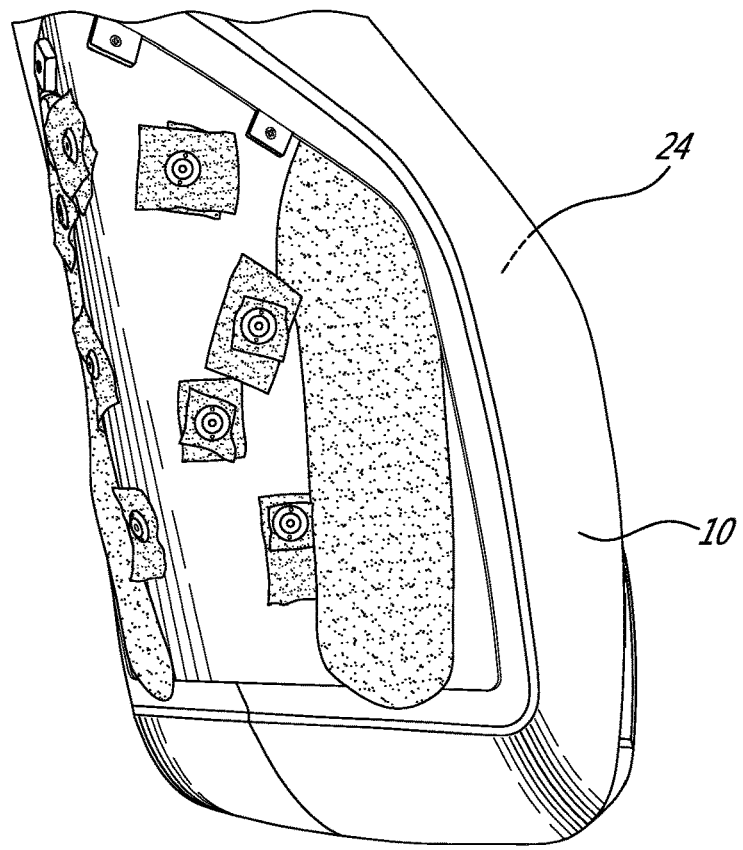
FIG. 5 is a rear view of the caul body abutting a composite structure.

FIG. 5 shows a rear view of the caul body 10 abutting the uncured composite structure 24. The caul body 10 may not necessarily surround the complete outer surface of the uncured composite structure 24. The caul body 10 and the uncured composite structure 24 are both placed within the autoclave in order to cure the uncured composite structure 24 to form the composite structure 24. The autoclave will not re-cure the already cured caul body 10, thereby allowing the caul body 10 to be reused during curing of many different composite structures 24.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A caul body for forming a composite structure, the caul body comprising: a laminate having at least one carbon layer and at least one silicone layer, the at least one silicone layer defining an outer surface of the laminate, the laminate having a first region and a second region, a thickness of the at least one carbon layer in the first region defining a first hardness value and a thickness of the at least one carbon layer in the second region defining a second hardness value, the thickness of the at least one carbon layer in the first region being greater than the thickness of the at least one carbon layer in the second region, and the first hardness value being greater than the second hardness value.

2. The caul body as defined in claim 1, wherein the at least one silicone layer includes two silicone layers, the at least one carbon layer being sandwiched between the two silicone layers.

3. The caul body as defined in claim 1, wherein the at least one carbon layer includes multiple plies of carbon.

4. The caul body as defined in claim 1, wherein the at least one silicone layer has a constant thickness.

5. The caul body as defined in claim 1, comprising an adhesive between the at least one carbon layer and the at least one silicone layer.

6. The caul body as defined in claim 5, wherein the adhesive is a dry glass fabric.

7. The caul body as defined in claim 1, wherein the first region is substantially flat.

8. A method of forming a composite structure, the method comprising:
   laying-up a first surface of an uncured composite structure against a first mold region and a second mold region of a mold, the first mold region having a curvature value less than a curvature value of the second mold region;
   placing an outer silicone layer of a caul body to cover the uncured composite structure laid-up against the mold and to overlap the first mold region with a first caul region of the caul body, and to overlap the second mold region with a second caul region of the caul body, the first caul region having a hardness value greater than a hardness value of the second caul region; and
   curing the uncured composite structure covered by the caul body with pressure and heat to form a first composite region and a second composite region of the composite structure.

9. The method as defined in claim 8, further comprising finishing the second composite region of the composite structure more than the first composite region of the composite structure.

10. The method as defined in claim 8, wherein placing the outer silicone layer of the caul body includes placing the caul body being already cured to cover the uncured composite structure laid-up against the mold, and wherein curing the uncured composite structure covered by the caul body does not cure the already-cured caul body.

11. A caul body for forming a composite structure, the caul body comprising: a laminate including at least one carbon layer sandwiched between silicone layers, the silicone layers defining at least one outer surface of the laminate to abut against the composite structure, the laminate having a first region having a first hardness value defined by a thickness of the at least one carbon layer in the first region and the laminate having at least a second region having a second hardness value defined by the thickness of the at least one carbon layer in the at least second region, the second hardness value being less than the first hardness value, and the thickness of the at least one carbon layer in the first region being greater than the thickness of the at least one carbon layer in the second region.

12. The caul body as defined in claim 11, wherein the second region is more curved than the first region.

13. The caul body as defined in claim 11, wherein the at least one carbon layer includes multiple plies of carbon.

14. The caul body as defined in claim 11, wherein the silicone layers have a constant thickness.

15. The caul body as defined in claim 11, further comprising an adhesive between the at least one carbon layer and the silicone layers.

16. The caul body as defined in claim 15, wherein the adhesive is a dry glass fabric.

17. The caul body as defined in claim 11, wherein the first region is substantially flat.

18. A method of forming a caul body, the method comprising:
   laying-up at least one uncured carbon layer;
   varying a thickness of the at least one uncured carbon layer to form a first region of the caul body having a first hardness value and at least a second region of the caul body having a second hardness value less than the first hardness value;
   laying-up at least one uncured silicone layer to cover the at least one uncured carbon layer; and
   curing the at least one uncured carbon layer and the at least one uncured silicone layer into a laminate, the cured at least one silicone layer forming an outer surface of the caul body.

19. The method as defined in claim 18, wherein laying-up the at least one uncured silicone layer includes placing an adhesive between the at least one uncured carbon layer and the at least one uncured silicone layer.

20. The method as defined in claim 18, wherein laying-up the at least one uncured silicone layer includes sandwiching the at least one uncured carbon layer between the at least one uncured silicone layer.

\* \* \* \* \*